US009565579B2

(12) United States Patent
Ekambaram et al.

(10) Patent No.: US 9,565,579 B2
(45) Date of Patent: *Feb. 7, 2017

(54) SAMPLING OF DEVICE STATES FOR MOBILE SOFTWARE APPLICATIONS

(71) Applicant: International Business Machines Corporation, Armonk, NY (US)

(72) Inventors: Vijay Ekambaram, Tamilnadu (IN); Ashish K. Mathur, Bangalore (IN); Vikrant Nandakumar, Bangalore (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,165

(22) Filed: Apr. 15, 2015

(65) Prior Publication Data
US 2016/0098337 A1    Apr. 7, 2016

Related U.S. Application Data

(63) Continuation of application No. 14/504,470, filed on Oct. 2, 2014, now Pat. No. 9,398,476.

(51) Int. Cl.
*H04M 3/00*    (2006.01)
*H04W 24/00*    (2009.01)
(Continued)

(52) U.S. Cl.
CPC .............. *H04W 24/02* (2013.01); *G06F 9/542* (2013.01); *G06F 11/302* (2013.01);
(Continued)

(58) Field of Classification Search
CPC .................................................. G06F 11/3409
(Continued)

(56) References Cited

U.S. PATENT DOCUMENTS 8,605,613 B2    12/2013   Zazula et al.
8,737,980 B2     5/2014   Doshi et al.
(Continued)

OTHER PUBLICATIONS

List of IBM Patents or Patent Applications Treated as Related, Filed May 24, 2016.
(Continued)

*Primary Examiner* — William D Cumming
(74) *Attorney, Agent, or Firm* — Daniel R. Simek

(57) ABSTRACT

A method for monitoring software application performance and one or more device states affecting a software application on a periodic basis on a mobile device. The method includes one or more computer processors identifying a software application on a mobile device. The method further includes the one or more computer processors identifying a plurality of sampling plans and one or more respective triggers within the plurality of sampling plans that are respectively associated with the software application and are stored on the mobile device. The method further includes the one or more computer processors determining a first value associated with the one or more respective triggers. The method further includes the one or more computer processors selecting a first sampling plan from the plurality of sampling plans for the software application based, at least in part, on the value associated with the one or more respective triggers.

8 Claims, 6 Drawing Sheets

(51) Int. Cl.
*H04W 24/02* (2009.01)
*G06F 11/34* (2006.01)
*G06F 9/54* (2006.01)
*G06F 11/30* (2006.01)
*H04W 4/00* (2009.01)
*H04W 24/10* (2009.01)

(52) U.S. Cl.
CPC ...... *G06F 11/3013* (2013.01); *G06F 11/3096* (2013.01); *G06F 11/3409* (2013.01); *G06F 11/3466* (2013.01); *H04W 4/001* (2013.01); *H04W 24/10* (2013.01)

(58) Field of Classification Search
USPC .......................................... 455/418, 419, 423
See application file for complete search history.

(56) References Cited

U.S. PATENT DOCUMENTS

| | | | |
|---|---|---|---|
| 9,036,808 B2 | 5/2015 | Kelley et al. | |
| 9,398,476 B2* | 7/2016 | Ekambaram | G06F 11/3409 |
| 2012/0253745 A1 | 10/2012 | Dhanapal et al. | |
| 2013/0054792 A1 | 2/2013 | Sharaf | |
| 2013/0080634 A1 | 3/2013 | Grelewicz et al. | |
| 2013/0190095 A1 | 7/2013 | Gadher et al. | |
| 2014/0026122 A1 | 1/2014 | Markande et al. | |
| 2014/0045597 A1 | 2/2014 | Fernandez et al. | |
| 2014/0141768 A1 | 5/2014 | Javaid et al. | |
| 2015/0071427 A1 | 3/2015 | Kelley et al. | |
| 2015/0087288 A1 | 3/2015 | Dharawat et al. | |
| 2015/0178724 A1 | 6/2015 | Ngo et al. | |
| 2015/0180836 A1 | 6/2015 | Wong et al. | |
| 2015/0213512 A1 | 7/2015 | Spievak et al. | |
| 2015/0243329 A1 | 8/2015 | Hadorn et al. | |

OTHER PUBLICATIONS

Ekambaram, et al., "Sampling of Device States for Mobile Software Applications", U.S. Appl. No. 14/504,470, filed Oct. 2, 2014.
Ekambaram, et al., "Sampling of Device States for Mobile Software Applications", U.S. Appl. No. 15/162,648, filed May 24, 2016.
Chandra, et al., "Contextual Fuzzing for Mobile App Testing", Microsoft Research, © 2014 Microsoft, <http://research.microsoft.com/en-us/projects/contextual-fuzzing/>.
Hong, E., "Mobile Apps Insufficiently Tested on Real Mobile Devices", Apr. 3, 2014, © L'Atelier BNP Paribas, <http://www.atelier.net/en/trends/articles/mobile-apps-insufficiently-tested-real-mobile-devices_428527>.
Huston, T., "What is Real-User Monitoring?", AlertSite UXM by SmartBear, © 2014 SmartBear Software, <http://alertsite.com/what-is-real-user-monitoring.html>.
Hyndman, et al., "4.8 Regression with time series data", © 2014 OTexts, printed Jul. 17, 2014, <https://www.otexts.org/fpp/4/8>.
Kakousis, et al., "Testing self-adaptive applications with simulation of context events", Proceedings of the Third International DisCoTec Workshop on Context-Aware Adaptation Mechanisms for Pervasive and Ubiquitous Services (CAMPUS 2010), Electronic Communications of the EASST, vol. 28 (2010), ISSN 1863-2122.
Liang, et al., "Context Virtualizer: A Cloud Service for Automated Large-scale Mobile App Testing under Real-World Conditions", MSR-TR-2013-103, Jul. 19, 2013, Microsoft Research.
Liu, et al, "Scalable Context Simulation for Mobile Applications", OTM Workshops 2006, LNCS 4278, pp. 1391-1400, 2006, © Springer-Verlag Berlin Heidelberg 2006.
Rexed, H., "Performance Testing for Mobile Applications: Emulators and Devices" May 14, 2014, © 2005-2014 Neotys USA, Inc., <http://www.neotys.com/blog/performance-testing-mobile-applications-emulators-devices/>.
"Correlation coefficient", From Wikipedia, the free encyclopedia, Last modified on Feb. 27, 2014, Wikipedia® is a registered trademark of the Wikimedia Foundation, Inc., <http://en.wikipedia.org/wiki/Correlation_coefficient>.
"Interpolation", From Wikipedia, the free encyclopedia, Last modified on Apr. 12, 2014, Wikipedia® is a registered trademark of the Wikimedia Foundation, Inc., <http://en.wikipedia.org/wiki/Interpolation>.
List of IBM Patents or Patent Applications Treated as Related, Apr. 8, 2015.
Vijay Ekambaram, et al., "Sampling of Device States for Mobile Software Applications", U.S. Appl. No. 14/504,470, filed Oct. 2, 2014.

* cited by examiner

SAMPLING OF DEVICE STATES FOR MOBILE SOFTWARE APPLICATIONS

BACKGROUND OF THE INVENTION

The present invention relates generally to the field of mobile wireless communication devices, and more particularly to software application performance in mobile wireless communication devices.

Developments in cellular and computing technology have resulted in proliferation of smart handheld (e.g., mobile) electronic devices such as smart phones, tablet computers, advanced e-Readers, personal digital assistants (PDAs), etc. Further advances in miniaturization and materials have produced advanced capability wearable devices such as digital eyeglasses (e.g., smart glasses) and smart watches. Companies and businesses are developing e-commerce applications to take advantage of the opportunities presented by the growing number of highly-connected mobile users. While businesses strive to enhance the user experience of e-commerce applications, mobile devices are growing beyond e-mail, picture taking, web browsing, and playing media. Advanced features being incorporated into mobile devices now include accelerometers, thermometers, altimeters, barometers, compasses, chronographs, and GPS navigation. In addition, there are a myriad of third-party software applications (apps) available for download to the mobile devices which range from practical to entertaining.

This evolution in electronic devices and their corresponding services brings with it an increasing expectation of high-quality end-user experience. End-users expect apps to be responsive, accurate, and have a high availability. Many customers find the convenience of mobile access desirable; however, a poor-quality end-user experience may engender customer dissatisfaction. The environment of the mobile device and the state within the mobile device where the software program executes is constantly in flux. External factors such as signal strength and movement (e.g., continual change in GPS coordinates) can interact with internal factors such as the competition for device resources to degrade the behavior of a mobile application in ways unanticipated by the developer of the mobile application.

SUMMARY

According to an aspect of the present invention, there is a method, computer program product, and/or system for monitoring software application performance and one or more device states affecting a software application on a periodic basis on a mobile device. The method includes one or more computer processors identifying a software application on a mobile device. The method further includes one or more computer processors identifying a plurality of sampling plans and one or more respective triggers within the plurality of sampling plans that are respectively associated with the software application and are stored on the mobile device. The method further includes one or more computer processors determining a first value associated with the one or more respective triggers. The method further includes one or more computer processors selecting a first sampling plan from the plurality of sampling plans for the software application based, at least in part, on the value associated with the one or more respective triggers.

DETAILED DESCRIPTION

Figure 1:
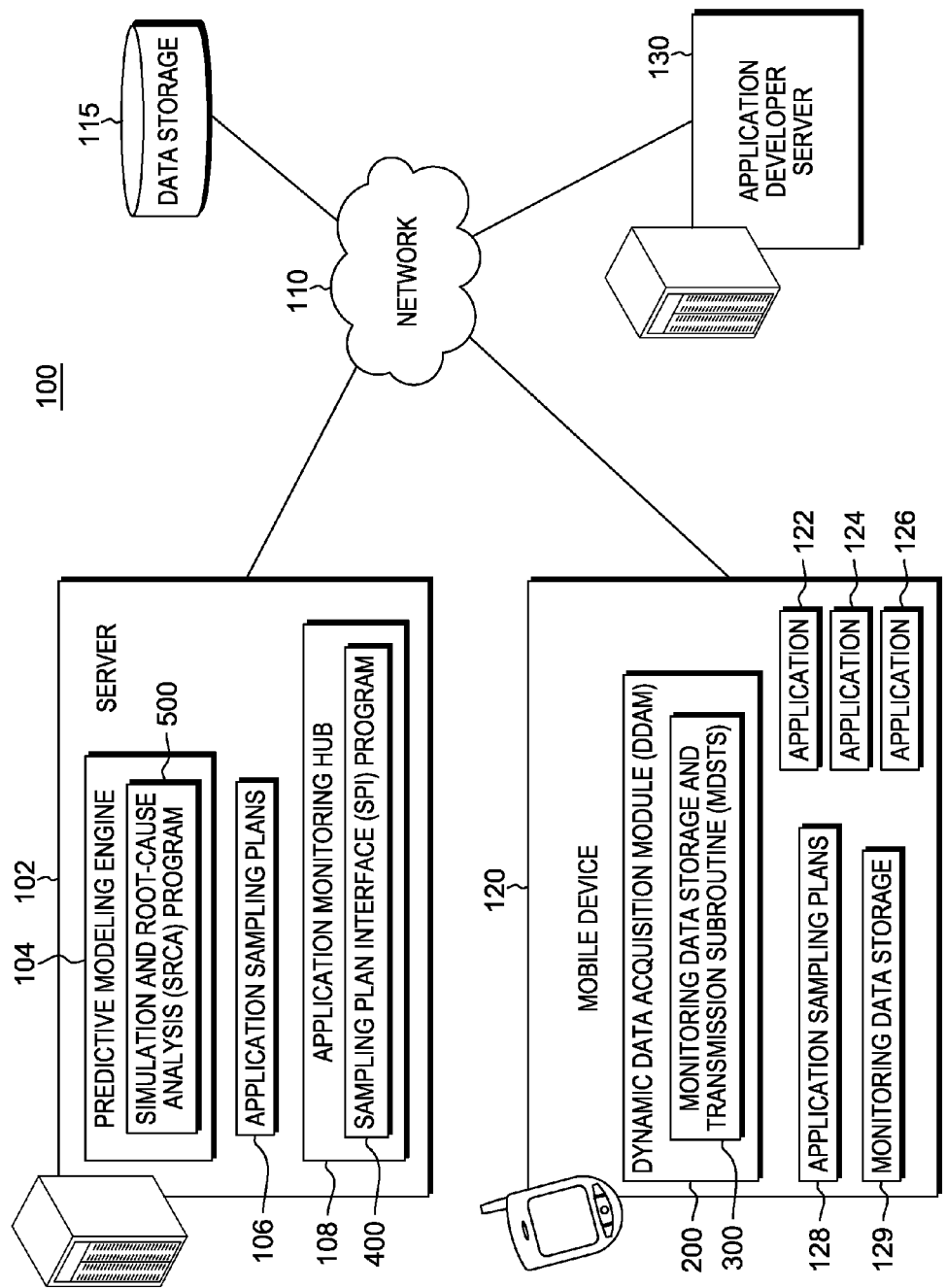
FIG. 1 illustrates a distributed data processing environment, in accordance with an embodiment of the present invention.

Consumer tolerance for applications (apps) with large numbers of programming errors (i.e., program bugs) is low, and as a result, the attrition rate for downloaded apps is high. The reactions of a mobile software application to device state emulation and synthetic transactions during development are useful in identifying some functional bugs, but it is difficult to capture the real-world contexts (e.g., a fast moving scenario) in which the application will function. Although developers use beta testing in the field to identify performance issues, once the app is released, the mobile users may only allow for a relatively short period of time for an application to show its worth. Therefore, some developers/providers of mobile services desire monitoring of the performance of their mobile software apps and end-user experience (EUE) in order to rapidly respond to issues. Real User Monitoring (RUM) provides a method to collect data directly about the states of a mobile device (e.g., CPU usage, sensor states, network conditions, etc.) and to provide that data within a context (e.g., heavy RAM usage, frequent calls, varying signal strength, WiFi to G3 toggling, which other apps are executing, resource conflicts between apps, etc.). However, while trying to improve the end-user experience for one application, the developer potentially affects the performance (e.g., reduced battery charge life, sluggish response, etc.) of the mobile device in a negative manner.

Although some functional bugs in mobile applications are identified during development and bench testing under various conditions, performance bugs are harder to identify. Performance bugs do not occur all the time but instead occur only when the mobile device is in certain states. In addition, there are a wide variety of mobile applications (apps) available to the users of these mobile devices. As a result, there are nearly endless combinations of potential app installations and configurations that, in some cases, contribute to performance issues on a given device. Furthermore, the developers of mobile apps range from a single individual to teams employed by multi-national corporations, so testing and quality control are similarly subjects of variation. Whereas a user would not expect a mobile software application created by an individual to be bug free, the developers of high-end mobile applications and services are expected to provide dependable performance. However, the mobile device operates in a constantly changing environment. Over time, various situations arise that affect the performance of a mobile software application both directly (e.g., the general states of the mobile device) and indirectly (e.g., the behavior of other mobile apps is not as stable as the mobile software application).

Embodiments of the current invention recognize that mobile devices are usually resource constrained. Real user monitoring is an essential tool in a developer's toolbox, but it should be judiciously employed. To this end, embodiments of the current invention provide a method for dynamically addressing the need for real user monitoring to improve mobile device apps. A goal of this is to effectively capture the state of mobile hardware elements with minimal power and performance overhead. A predictive modeling engine develops sampling plans for mobile apps to determine various states of the mobile device and other related factors that potentially influence performance and where possible, identify the app's performance. The monitoring software on the mobile device employs "sensing intelligence" as one control of the choice of sampling plans. In one embodiment of the present invention, the primary mobile device resource that the sensing intelligence monitors is the power resources of the mobile device. Generally speaking, the sampling plans are at least bimodal with a high data/high sampling rate plan employed when the battery power level of a mobile device is high and reduced data collection at a lower sampling rate when the battery power level is low. The data is fed back into the predictive modeling engine to refine the sampling plans further. As the sampling plans are refined, the sampling plans are automatically downloaded to the mobile device. Refining the sampling plans includes items such as the elimination of device states that do not affect the performance of the mobile software application; reducing the sampling rate frequency as the mobile software application matures and the performance stabilizes; and updating the models used by the predictive modeling engine. The updated models contribute to improvements in the simulations formulated by the predictive modeling engine and, in some scenarios, the improved simulations enhance the next generation of mobile software applications. This iterative process is designed to provide the developer substantive data while reducing the demands on the mobile device. Monitoring data and intermediate sampling plans are not deleted but stored for subsequent analysis. Correlation coefficients and interactions between parameters are able to be determined from this information. The predictive modeling engine suggests mobile device states that are capable of being determined from other parameters and once validated are removed from a sampling plan (e.g., low power plan). In addition, this information is used to create "dummy" peer apps (e.g., processes) that are to be employed in various emulation scenarios.

In addition to iteratively refining sampling plans for a mobile software application, the predictive modeling engine analyzes the requirements and behaviors of a different mobile software application that does not have defined sampling plans and creates "preliminary" sampling plans for the different mobile software program. Similarly, the predictive model engine is capable of analyzing the data from "bench tests" of a new mobile software program to create preliminary sampling plans.

Another aspect of the current invention is that the predictive modeling engine is "trained" to identify the root-causes of performance issues. In other words, the predictive modeling engine learns to more effectively identify the root-causes of performance issues (e.g., a given type of mobile app, mobile apps accessing the same advanced features) as it analyzes the data from other mobile software application. For example, a specific combination of device states generally causes mobile apps that use more than "x" amount of RAM to respond more slowly. Mobile devices, hardware states, dummy processes (e.g., synthetic apps), and environmental conditions are emulatable. For example, in one embodiment, the predictive modeling engine generates a list of anticipated performance issues. In another example, the developer of a mobile software application uses the predictive modeling engine to create new mobile device states and predict possible state values without actually capturing data. Although, in some embodiments, this emulation strategy (e.g., creating a variety of virtual mobile devices, populating them with a gallery of synthetic apps, and interacting with pseudo-users) is used in a wide variety of hardware and software environments, many embodiments of the present invention utilize a cloud-computing model.

The present invention will now be described in detail with reference to the Figures. FIG. 1 is a functional block diagram illustrating distributed data processing environment 100, in accordance with an embodiment of the present invention. An embodiment of distributed data processing environment 100 includes server 102, mobile device 120, data storage 115, and application developer server 130 all interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as mobile device 120 or application developer server 130 via network 110. Server 102 may include components as depicted and described in further detail with respect to FIG. 6, in accordance with embodiments of the present invention.

In one embodiment, mobile device 120, server 102, and application developer server 130 communicate through network 110. Network 110 can be, for example, a local area network (LAN), a telecommunications network, a wide area network (WAN) such as the Internet, or any combination of the three, and can include wired, wireless, or fiber optic connections. In general, network 110 can be any combination of connections and protocols that will support communications between mobile device 120, server 102, and application developer server 130, in accordance with embodiments of the present invention.

Server 102 includes predictive modeling engine 104, application (app) sampling plans 106, application monitoring hub 108, and other data resources (not shown). Application monitoring hub 108 includes sampling plan interface (SPI) program 400. Predictive modeling engine 104 includes simulation and root-cause analysis (SRCA) program 500. Predictive modeling engine 104 and simulation and root-cause analysis (SRCA) program 500 utilize a variety of analytical (e.g., design of experiments) and statistical methods (e.g., ANOVA, linear regressions, multivariate regression, etc.) to determine the relationships between device states and other interactions, develop models to predict the probability of performance events based on conditions, and improve simulation accuracy. For example, simultaneous perturbation stochastic approximation (SPSA) is an algorithmic method for optimizing systems with multiple unknown parameters. SPSA is a type of stochastic approximation algorithm that is appropriately suited to adaptive modeling and simulation optimization. In another example, Monte Carlo-type simulations are used by the predictive modeling engine to determine the probabilities for various "what-if" scenarios and prioritize data collection for device states in sampling plans based on the anticipated chance of an event occurrence and the level of impact the occurrence produces. However, these examples are not meant to be limiting. As such, in various embodiments, predictive modeling engine 104 and SRCA program 500 utilize any of a wide variety of methods.

In an embodiment, simulation and root-cause analysis (SRCA) program 500 executes simulations to determine possible scenarios that result in performance issues. In one example, SRCA program 500 executes a simulation directly on server 102. In another example, simulation and root-cause analysis (SRCA) program 500 assigns a larger simulation to execute in a cloud-computing environment. The variables incorporated within simulations that SRCA program 500 creates include multiple mobile device hardware emulations, synthetic processes (e.g., pseudo-user interactions, multi-application resource allocations, etc.), and device state parameters (e.g., static, dynamic, transient, etc.). Furthermore, in some instances, any or all of the variables incorporated within SRCA program 500 simulations are subject to perturbations and permutations during the simulation process. In another embodiment, SRCA program 500 optimizes sampling plans that already exist. For example, SRCA program 500 identifies a device state that has little to no effect on the performance of a mobile software application. SRCA program 500 substitutes a different device state to monitor or SRCA program 500 eliminates the monitored device state thereby reducing the overhead experienced by mobile device 120 when executing the associated sampling plan. In another example, simulations show that the developer of the mobile software application has sufficiently optimized the application that the monitoring frequency is capable of being reduced.

Application developer server 130 may be a laptop computer, a tablet computer, a netbook computer, a personal computer (PC), a desktop computer, a personal digital assistant (PDA), a smart phone, or any programmable computer system known in the art. In certain embodiments, application developer server 130 represents a computer system utilizing clustered computers and components (e.g., database server computers, application server computers, etc.) that act as a single pool of seamless resources when accessed through network 110, as is common in data centers and with cloud-computing applications. In general, application developer server 130 is representative of any programmable electronic device or combination of programmable electronic devices capable of executing machine readable program instructions and communicating with client computers, such as mobile device 120 and server 102 via network 110. In one embodiment, application developer server 130 hosts some of all of the software and data supported by server 102. In one scenario, the software and data are identical (e.g., licensed). For example, predictive modeling engine 104, application sampling plans 106, application monitoring hub 108, and other data resources (not shown). Application monitoring hub 108 includes sampling plan interface (SPI) program 400. Predictive modeling engine 104 includes simulation and root-cause analysis (SRCA) program 500. In another scenario, an independent software vendor (ISV) (not shown) owns application developer server 130. Application developer server 130 hosts internally developed versions of predictive modeling engine 104, simulation and root-cause analysis (SRCA) program 500, application monitoring hub 108, sampling plan interface (SPI) program 400, application sampling plans 106, and other data resources (not shown). Application developer server 130 may include components as depicted and described in further detail with respect to FIG. 6, in accordance with embodiments of the present invention.

Mobile device 120 may be a laptop computer, a tablet computer, a netbook computer, a personal digital assistant (PDA), a smart phone, a wearable device (e.g., digital eyeglasses, smart glasses, smart watches), or any programmable computer system operating wirelessly known in the art. In general, mobile device 120 is representative of any programmable electronic device or combination of programmable electronic devices capable of executing machine readable program instructions and communicating with client computers, such as server 102 or application developer server 130 via network 110. Mobile device 120 may include components as depicted and described in further detail with respect to FIG. 6, in accordance with embodiments of the present invention.

Mobile device 120 includes dynamic data acquisition module (DDAM) 200, application 122, application 124, application 126, application sampling plans 128, monitoring data storage 129, and other software and electronic features (not shown). Mobile device 120 also includes monitoring data storage and transmission subroutine (MDSTS) 300 supporting dynamic data acquisition module (DDAM) 200.

In an embodiment, dynamic data acquisition module (DDAM) 200 and monitoring data storage and transmission subroutine (MDSTS) 300 are incorporated (e.g., embedded) within the code of an application and executes as the application executes.

In one embodiment, DDAM 200 (including monitoring data storage and transmission subroutine (MDSTS) 300) is a software application in and of itself that executes in the background of mobile device 120 whenever a mobile software application associated with DDAM 200 executes. In an embodiment, DDAM 200 supports apps developed by the owner of server 102. In another embodiment, the owner of server 102 is a provider of analytic and testing services that sells subscriptions to software developers to use predictive modeling engine 104, application sampling plans 106, and application monitoring hub 108. For example, in this embodiment, application 124 experiences a performance issue, but the independent software vendor (ISV) (not shown) that developed application 124 does not wish to develop a new version of application 124 to incorporate into DDAM 200. DDAM 200 attempts to determine the root-cause of performance issues when performance issues occur and includes the root-cause information as part of the monitoring data transmitted for application 124.

Alternatively, the monitoring data for application 124 is analyzed by predictive modeling engine 104 for root-cause identifications. In this example, the ISV purchases a subscription to use predictive modeling engine 104, SRCA program 500, application sampling plans 106, and application monitoring hub 108. When DDAM 200 accesses application monitoring hub 108, DDAM 200 identifies which apps are installed on mobile device 120. Application monitoring hub 108 notifies DDAM 200 that application 124 is on a monitored application list (not shown), DDAM 200 downloads the application sampling plan(s) for application 124, and predictive modeling engine 104 accumulates monitoring data (e.g., performance data and one or more monitored mobile device states). Alternatively, the ISV for application 124 transmits DDAM 200 as part of a software update and requests the user of mobile device 120 to install DDAM 200. For example, the ISV for application 124 incentivizes the installation of DDAM 200 (e.g., by reducing the cost to execute application 124, by providing free smartphone minutes, by listing companies that support DDAM 200, etc.).

Figure 2:
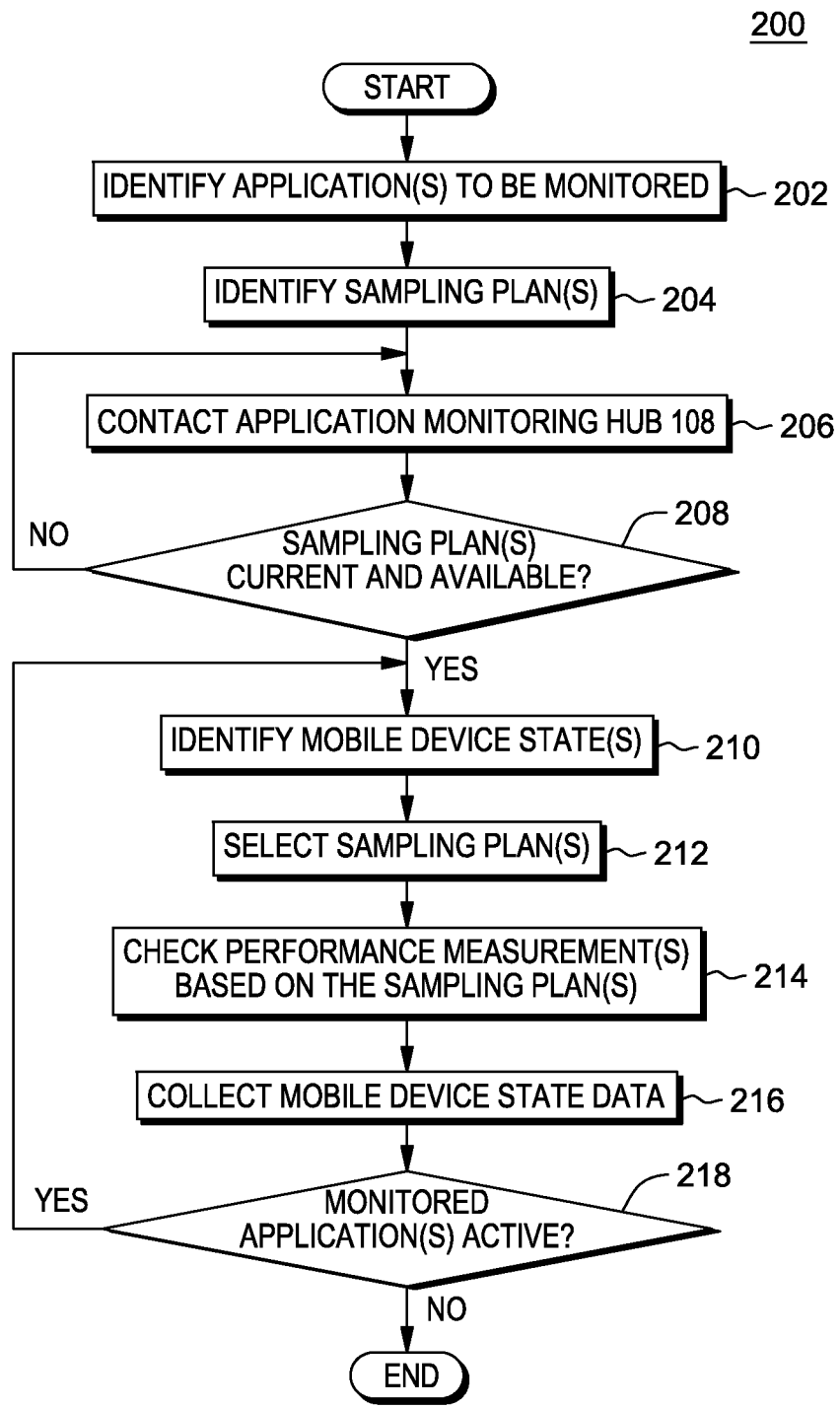
FIG. 2 depicts a flowchart of the steps of a dynamic data acquisition module, in accordance with an embodiment of the present invention.

FIG. 2 is a flowchart depicting operational steps of dynamic data acquisition module (DDAM) 200. DDAM 200 executes on mobile device 120 within distributed data processing system 100 of FIG. 1 to capture performance data for one or more wireless mobile software applications (apps) and obtain state data for mobile device 120 based on a resource dependent sampling plan for each monitored mobile software application. Note that, in this embodiment, MDSTS 300 executes in conjunction with DDAM 200. In this example embodiment, DDAM 200 receives qualified sampling plans for application 122 from a library of application sampling plans 106. DDAM 200 transmits performance data via MDSTS 300. When the power level of mobile device 120 is high, DDAM 200 transmits performance data and a large set state data frequently. However, when the power level of mobile device 120 is low, DDAM 200 transmits performance data less frequently with a smaller subset of state data. For example, state data collected from mobile device 120 in a high-power regime includes power level, GPS coordinates, WiFi state, CPU usage by mobile software application, signal strength, and a list of executing software programs. Additionally, the data is transmitted every 10 seconds while application 122 is active. In another example, mobile device 120 operates in a low-power regime. DDAM 200 selects the low-power sampling plan for application 122 which includes battery power level, signal strength, CPU usage, GPS coordinates, and data is transmitted every 60 seconds, via MDSTS 300, while application 122 is active.

In another embodiment, application 124 is a newly deployed application; therefore, there is no qualified sampling plan. DDAM 200 receives a "training" sampling plan determined by predictive modeling engine 104 on server 102 based on the application sampling plans 106 for a similar mobile software application. For example, until predictive modeling engine 104 has analyzed sufficient data to verify correlation coefficients and interactions between mobile device states, application 124 is assigned the high-power sampling plan of application 126. The low-power sampling plan is made up of the battery power level plus three randomly selected device states and data is transmitted, via MDSTS 300, every two minutes.

In yet another embodiment, additional sampling plans exists. Additional sampling plans are triggered by an event or override not based on the battery power level of mobile device 120. For example, the additional sampling plans are duplicates of the high-power and low-power sampling plans with additional triggers defined. Further embodiments expand or refine the use of alternate triggers in sampling plans while maintaining the core monitoring strategy.

In an embodiment, DDAM 200 is an application in and of itself that executes in the background of mobile device 120 whenever an application associated with DDAM 200 executes. For example, application 122, application 124, and application 126 have sampling plans associated with them and are monitored by DDAM 200. Whenever one or more apps (e.g., application 122, application 124, and application 126) execute, DDAM 200 also executes. For example, when application 122 and application 126 execute, DDAM 200 transmits the performance data and sampling data to server 102 to be analyzed by predictive modeling engine 104. In another example, when application 124 executes, DDAM 200 transmits the performance and sampling data to application developer server 130 for analysis by third-party software.

Referring to FIG. 2, in step 202, DDAM 200 identifies the executing mobile software applications to be monitored (e.g., application 122, application 124, and application 126) and proceeds to step 204. In an embodiment, DDAM 200 is incorporated as part of the code of the mobile software application and initiates as the application executes. In another embodiment, DDAM 200 is a separate mobile software program. In step 202, DDAM 200 identifies the other mobile software applications on mobile device 120 that are monitored. For example, DDAM 200 creates and maintains a list of monitored mobile software applications on mobile device 120. As a new mobile software application is downloaded to mobile device 120, the new mobile software application is flagged for monitoring as part of the installation process.

Alternatively, DDAM 200 scans information related to application sampling plans 128 to identify the one or more mobile software applications associated with a mobile software application sampling plan. For example, sampling plans that are common to multiple mobile software applications have the associated mobile software applications identified internally (e.g., metadata). This saves memory space on mobile device 120 by eliminating redundant sampling plans. In another embodiment, after the initial installation of DDAM 200 as a unique software application, DDAM 200 identifies indications (e.g., metadata flags) that are associated with mobile software programs (e.g., new, currently installed on mobile device 120) and flags the identified mobile software programs as monitored mobile software applications. In yet another embodiment, an external entity identifies the mobile software application to monitor. For example, the manufacturer of mobile device 120 has agreements with a number of mobile software application developers. As part of the support for mobile device 120, the manufacturer of mobile device 120 maintains a list of monitored mobile software applications as part of the agreements with the mobile software application developers and routinely downloads the updated list of monitored mobile software applications as part of the support for mobile device 120. In another example, a list of monitored mobile software applications exists on the Internet. Once DDAM 200 is installed on mobile device 120, DDAM 200 periodically accesses the Internet to check which mobile software applications are monitored. In this other example, the list of monitored mobile software applications on the Internet includes version control. If the list of monitored mobile software applications on the Internet shows that a newer version (e.g., updated version) of the mobile software application installed on mobile device 120 is available, then DDAM 200 sets a version flag to be subsequently used in step 206.

In step 204, DDAM 200 identifies which mobile software application sampling plans, included as part of application sampling plans 128, are available for use with the mobile software application(s) to be monitored. In an embodiment, DDAM 200 identifies sampling plans for each executing mobile software application (e.g., application 122, application 124, and application 126). In another embodiment, DDAM 200 determines that sampling plans are not available on mobile device 120 for a mobile software application that requires monitoring (e.g., application 124).

In step 206, DDAM 200 contacts application monitoring hub 108 executing on server 102 via network 110, as shown in FIG. 1. In an embodiment, application monitoring hub 108 identifies the sampling plan versions that are associated with application 122 and application 126. If DDAM 200 determines that the version of an identified sampling plans for application 126, in application sampling plans 128, are back-level versions of the application sampling plans in application sampling plans 106 on server 102 (no branch, decision 208), then DDAM 200 downloads the most recent application sampling plan from server 102 to mobile device 120 via network 110. DDAM 200 replaces the sampling plans for application 126 in application sampling plans 128 with the downloaded version of the sampling plans. In another embodiment, DDAM 200 determines that no sampling plans exist within application sampling plans 128 for application 124 (no branch, decision 208). DDAM 200 downloads the sampling plans associated with application 124 from application sampling plans 106 on server 102 via network 110.

In yet another embodiment, no sampling plan is found for application 124, server 102, data storage 115, or application developer server 130. In this embodiment, application monitoring hub 108 contacts predictive modeling engine 104 to determine a sampling plan for application 124. In an embodiment, predictive modeling engine 104 compares the requirements of application 124 with sampling plans for similar mobile software application within application sampling plans 106. In yet another embodiment, predictive modeling engine 104 contacts the ISV through application developer server 130 for performance and parametric requirements for application 124. Predictive modeling engine 104 uses the performance and parametric requirements for application 124 to create preliminary sampling plans for application 124 and stores the preliminary sampling plans in application sampling plans 106 for download to mobile device 120 by DDAM 200 via network 110.

In step 210, DDAM 200 identifies the one or more mobile device states that trigger which sampling plan is selected for the state data collection and processing of the collected state data. In an embodiment, a mobile software application has two sampling plans. One sampling plan for when the battery state is above a defined threshold and another sampling plan for when the battery state is below a defined threshold. For example, DDAM 200 determines that a sampling plan has the low battery state threshold to be 40% charge. Alternatively, since the battery life varies between types of mobile devices, the low battery threshold is expressed as a function of time. For example, the low battery threshold is set at one hour of remaining battery life. In another embodiment, one or more device states, conditions, or criteria (e.g., events, overrides, etc.) defined within the sampling plan(s) affects which sampling plan DDAM 200 selects. In certain scenarios and embodiments, only one sampling plan will be active at any time for a particular mobile software application; however, this does not preclude an embodiment that allows multiple sampling plans to be active. For example, if the user of device 120 is watching a high-definition streaming video, DDAM 200 determines that device 120 is band width and resource constrained and selects (e.g., switches to) an application sampling plan that collects less data and transmits less frequently.

In an example embodiment, DDAM 200 is capable of interpreting a multi-tiered sampling plan or a sampling plan that contains logical operations to select different mobile device states or data to monitor and adjust one or both of the rate of monitoring data sampling and rate of monitoring data transmission. In another example embodiment, sampling plans are linked. For example, each mobile software application has unique primary high/low sampling plans but access the same "transmission failure" sampling plan. In another embodiment, DDAM 200 identifies a list of "contingency protocols" which take precedence over sampling plans. In one example, the user of mobile device 120 is a member of an emergency response team. If DDAM 200 detects that a mission-critical program is active (e.g., heart monitor communicating with a hospital), then DDAM 200 halts sampling, performance data, state collection, and transmission until the mission critical program (not shown) stops executing. In one embodiment, DDAM 200 is linked to an operating system or firmware of mobile device 120, which provides a program-to-program interface that provides options for control of the mobile software application monitoring. In another example, the "contingency protocols" identified by DDAM 200 only take precedence over sampling plans for participating mobile app developers.

In step 212, DDAM 200 selects a sampling plan for each monitored mobile software application based on the triggers within the sampling plans associated with the monitored mobile software application and the current device state(s) for the sampling triggers. In another embodiment, a sampling plan permits a performance trigger to acquire a snapshot of mobile device 120 state data as close to when an indication that an adverse performance effect occurred as possible rather than waiting until the next instance mobile device state data collection based on the sampling plan's data collection rate.

In step 214, DDAM 200 checks the performance measurements based on information within the selected sampling plan. In an embodiment, if the monitored mobile software application on mobile device 120 experiences a negative performance effect, then DDAM 200 prompts the user to confirm the perceived severity of the mobile software application's performance. For example, the user will be asked to rate the severity on a scale from 1-10 with 10 being the highest severity. Conversely, a null indication is used to signal that the mobile software application is performing normally from the perspective of the mobile device user. In another embodiment, DDAM 200 checks at the mobile device state parameters (e.g., % packet loss, response time, etc.) defined in the sampling plan for the mobile device software application to infer the performance of the software application. In another embodiment, for example, mobile device 120 is a smartphone, and the user identifies a negative performance occurrence by shaking the smartphone followed by pressing a simple key combination (e.g., **) to confirm, amend or refute the perceived severity level. Alternatively, DDAM 200 checks the mobile device state parameters (e.g., % packet loss, CPU usage, etc.) defined within the sampling plan for the non-adverse performance measurements.

In step 216, DDAM 200 collects the mobile device state data at a rate defined by the selected sampling plan for the monitored software application. DDAM 200 passes the mobile device state data, monitored mobile software application performance data, information about other executing software programs, etc. (e.g., monitoring data) to MDSTS 300. In an embodiment, the defined state data for mobile device 120 is collected at a constant rate until battery power level drops below a threshold level. When the battery power level drops below the threshold level, a different sampling plan using a subset of the defined state data and at a different sampling rate executes until either the monitored application terminates or the battery power level for mobile device 120 exceeds the threshold level. In another embodiment, the sampling plans for the monitored application have different battery power thresholds (e.g., a hysteresis loop). In one scenario, the battery power level of mobile device 120 drops below 30% that triggers DDAM 200 to transition application 124 from the "high power" sampling plan to the "low power" sampling plan. In another scenario, application 124 continues to execute while the battery power level on mobile device 120 increases (e.g., mobile device 120 is charging). However, in some embodiments, the "high power" sampling plan contains a secondary trigger that overrides the 30% power threshold. In one example, the secondary trigger is that the battery power level of mobile device 120 is greater than 50%. In another example, the secondary trigger includes the primary trigger (e.g., battery power level greater than 30% for a minimum of 10 minutes).

Along with mobile device state (e.g., CPU usage, WiFi signal strength, physical motion parameters, etc.), DDAM 200 determines which mobile software apps are active and executing on mobile device 120, including the status of application 122, application 124, and application 126. In another embodiment, DDAM 200 also determines the resources that the other executing mobile software apps are using and their contribution to the device states of mobile device 120.

If DDAM 200 determines that the monitored application is active (yes branch, decision 218), then DDAM 200 loops to accumulate additional performance and mobile device state data. In an embodiment, DDAM 200 does not detect that the power level threshold is reached or a triggering event has occurred. In this embodiment, DDAM 200 continues monitoring the mobile software application and device states of mobile device 120 based on the current sampling plan(s). In another embodiment and example, DDAM 200 determines that, during a subsequent loop, a change in one or more mobile device states controlling the sampling plan occurred. In response, DDAM 200 selects a sampling plan from application sampling plans 128 that satisfies one or both of the power level thresholds and the triggering event detected in step 210 at the beginning of the subsequent loop.

If DDAM 200 determines that a monitored application (e.g., application 126) is no longer active and executing (no branch, decision 218), then DDAM 200 stops accumulating monitoring data for that application. In an embodiment, MDSTS 300 transmits monitoring data for the monitored mobile software application(s) as the data is collected. In one embodiment, DDAM 200 and MDSTS 300 cease executing if DDAM 200 determines that a monitored application is no longer active and executing. In another embodiment, DDAM 200 is inactive until MDSTS 300 transmits the stored monitoring data. Once the stored monitoring data is transmitted (step 310), then DDAM 200 and MDSTS 300 cease execution.

Figure 3:
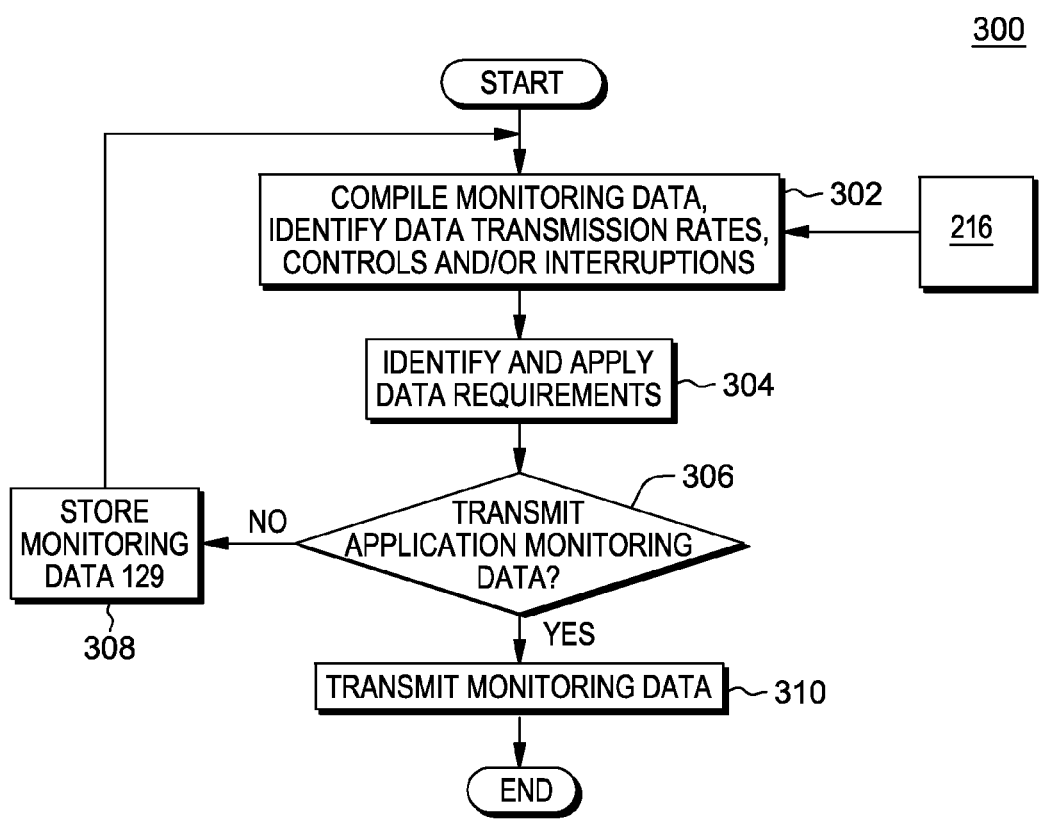
FIG. 3 depicts a flowchart of the steps of a monitoring data storage and transmission subroutine, in accordance with an embodiment of the present invention.

FIG. 3 is a flowchart depicting operational steps of monitoring data storage and transmission subroutine (MDSTS) 300. MDSTS 300 executes in conjunction with DDAM 200 on mobile device 120 within distributed data processing environment 100 of FIG. 1. In an embodiment, MDSTS 300 transmits the monitoring data to application monitoring hub 108 executing on server 102. In another embodiment, MDSTS 300 sends the monitoring data to the ISV controlling application developer server 130 via network 110 instead of application monitoring hub 108. For example, the ISV controlling application developer server 130 has their own version of predictive modeling engine 104 or other analytical software to analyze the monitoring data.

In step 302, MDSTS 300 compiles the monitoring data from DDAM 200 (step 216) and identifies data transmission controls associated with the sampling plan(s) for the monitored mobile software application on mobile device 120. Additionally, in step 302, MDSTS 300 generates signals and permissions that decision 306 acts upon based on the conditions identified within some embodiments. In an embodiment, there are defined responses, associated with the sampling plan, to respond to interruptions, events, or data transmission controls (e.g., override conditions, rules, user preferences, etc.) for the monitoring data. When there is no loss of connectivity between mobile device 120 and server 102, the monitoring data is continually transmitted. However, if MDSTS 300 identifies issues with data transmission, the compiled monitoring data is accumulated (e.g., stored) for transmission in the future. For example, if network 110 fails to link mobile device 120 to server 102, then mobile device 120 does not transmit the monitoring data to server 102. In another example, if a user has activated encryption software for all transmissions, then MDSTS 300 acquires device state data at the frequency specified in the sampling plan and stores the monitoring data on mobile device 120 until the encryption is deactivated. In another embodiment, MDSTS 300 determines that the transmission frequency is different from the sampling frequency. For example, the transmission frequency is based on a set number of monitoring data instances (e.g., every 20 instances). The high-power sampling plan frequency is every two minutes, and the low-power sampling plan frequency is every five minutes.

In one example, MDSTS 300 is able to transmit data continually to application monitoring hub 108 executing on server 102 via network 110. In response, MDSTS 300 deletes the monitoring data (e.g., performance data and one or more monitored mobile device states) for application 126 from mobile device 120. In another scenario, MDSTS 300 is unable to transmit the performance data nor transmit the monitoring data during the execution of application 126 or after application 126 stopped executing (e.g., lost connectivity to server 102, additional sampling trigger active delaying monitoring data transmission, application 126 between sampling periods, etc.). In response, MDSTS 300 determines when to resume transmitting based on data transmission controls (e.g., overrides, rules, user preferences, etc.) or other information.

In one embodiment, the data transmission controls are not required to be identical for each monitored application. For example, mobile device 120 communication with server 102 via network 110. In one instance, mobile device 120 resumes transmitting immediately upon successfully linking to server 102. In another instance, a different external entity (e.g., application developer server 130) instructs mobile device 120 when to resume transmitting monitoring data. In yet another instance, a rule, on mobile device 120, which is associated with data transmission, instructs MDSTS 300 to accumulate another set of monitoring data based on the transmission frequency of the sampling plan of application 124 (and as dictated by the current state of mobile device 120). At the end of the transmission frequency period, mobile device 120 sends the stored monitoring data for application 124 as well as the most recent set of monitoring data for application 124.

In step 304, MDSTS 300 identifies the entity to receive the transmitted monitoring data and any requirements associated with the monitoring data. In an embodiment, MDSTS 300 determines that the monitoring data is sent to server 102 via network 110. MDSTS 300 determines whether user information must be removed from the monitoring data prior to transmission and whether the monitoring data requires encryption when it is transmitted. For example, some information will be removed due to privacy requirements. In another example, the developer of application 122 precludes certain information about application 122 from being shared with any software vendor that does not have an NDA (non-disclosure agreement) signed with the developer of application 122. In another embodiment, monitoring data on mobile device 120 is encrypted while stored on the mobile device but is decrypted prior to transmission. For example, MDSTS 300 determines that the ISV controlling application developer server 130 receives the monitoring data for application 126 and that on-device (e.g., mobile device 120) encryption is required.

If MDSTS 300 determines that monitoring data is not to be transmitted (no branch, decision 306), then MDSTS 300 stores monitoring data storage 129 (in step 308) in non-volatile memory on mobile device 120. MDSTS 300 loops while waiting for a signal that includes permission for the transmission of data to resume. In addition, MDSTS 300 accumulates monitoring data from DDAM 200 (step 216). In an embodiment, if, in step 302, MDSTS 300 identified that the monitoring data transmission rate for a mobile software application (e.g., application 122) is different periodicity (e.g., slower) than the monitoring data sampling rate for the mobile software application (e.g., application 122), then MDSTS 300 stores the monitoring in monitoring data storage 129, in step 308. MDSTS 300 receives the signal and the permission at the monitoring data transmission rate (e.g., for application 122) identified in step 302, and subsequently transmits the stored monitoring data in step 308. In another embodiment, if MDSTS 300 identified a data transmission control (e.g., rule, override, event, etc.) in step 302, then MDSTS 300 determines the data transmission rate based on that data transmission control.

If MDSTS 300 determines that monitoring data transmission can resume (yes branch, decision 306), then the stored monitoring data for the monitored mobile software application(s) in monitoring data storage 129 and any current monitoring data for monitored mobile software application is transmitted by MDSTS 300 to application monitoring hub 108 on server 102 via network 110. In an embodiment, MDSTS 300 transmits the monitoring data to the appropriate external entity (e.g., server 102, application developer server 130, etc.) when communication is re-established with the external entity. In another scenario, the transmission of the current and stored monitoring data by MDSTS 300 is delayed if certain criteria are met. For example, MDSTS 300 identifies a rule on mobile device 120 and, in response, sets a preset delay on data transmission (e.g., 1 minute) to ensure that the communication with server 102 is stable. In another scenario, MDSTS 300 identifies a transmission control within the sampling plan for application 122 that resumes data transmission when the next set of monitoring data sampling instances is complete. For example, a high-power sampling plan for application 124 has a sampling frequency of every two minutes and a transmission frequency of every 20 monitoring data points. As such, if MDSTS 300 identifies that the current block of 20 monitoring data points has been compiled, then MDSTS 300 transmits the blocks of monitoring data points for application stored in monitoring data storage 129 and the currently compiled block of monitoring data points.

In step 310, MDSTS 300 transmits monitoring data to the entity identified in step 302 and applies any additional requirements. In an embodiment, MDSTS 300 transmits monitoring data from mobile device 120 to application monitoring hub 108, executing on server 102 via network 110. For example, the data transmission protocol between mobile device 120 and server 102 is file transmission protocol (FTP), and the data is encrypted unless it is stored in encrypted form. In another embodiment, MDSTS 300 sends the monitoring data from mobile device 120 to application developer server 130 via network 110. Upon successful transmission of data, MDSTS 300 deletes the monitoring data from monitoring data storage 129 on mobile device 120 unless instructed by the sampling plan or other control. For example, the low-power sampling plan for application 124 buffers 100 monitoring data instances in monitoring data storage 129. As MDSTS 300 transmits each new block of 10 monitoring data points, the new block of 10 points of monitoring data are stored in monitoring data storage 129 and the oldest block of 10 points of monitoring data for application 124 are deleted.

Figure 4:
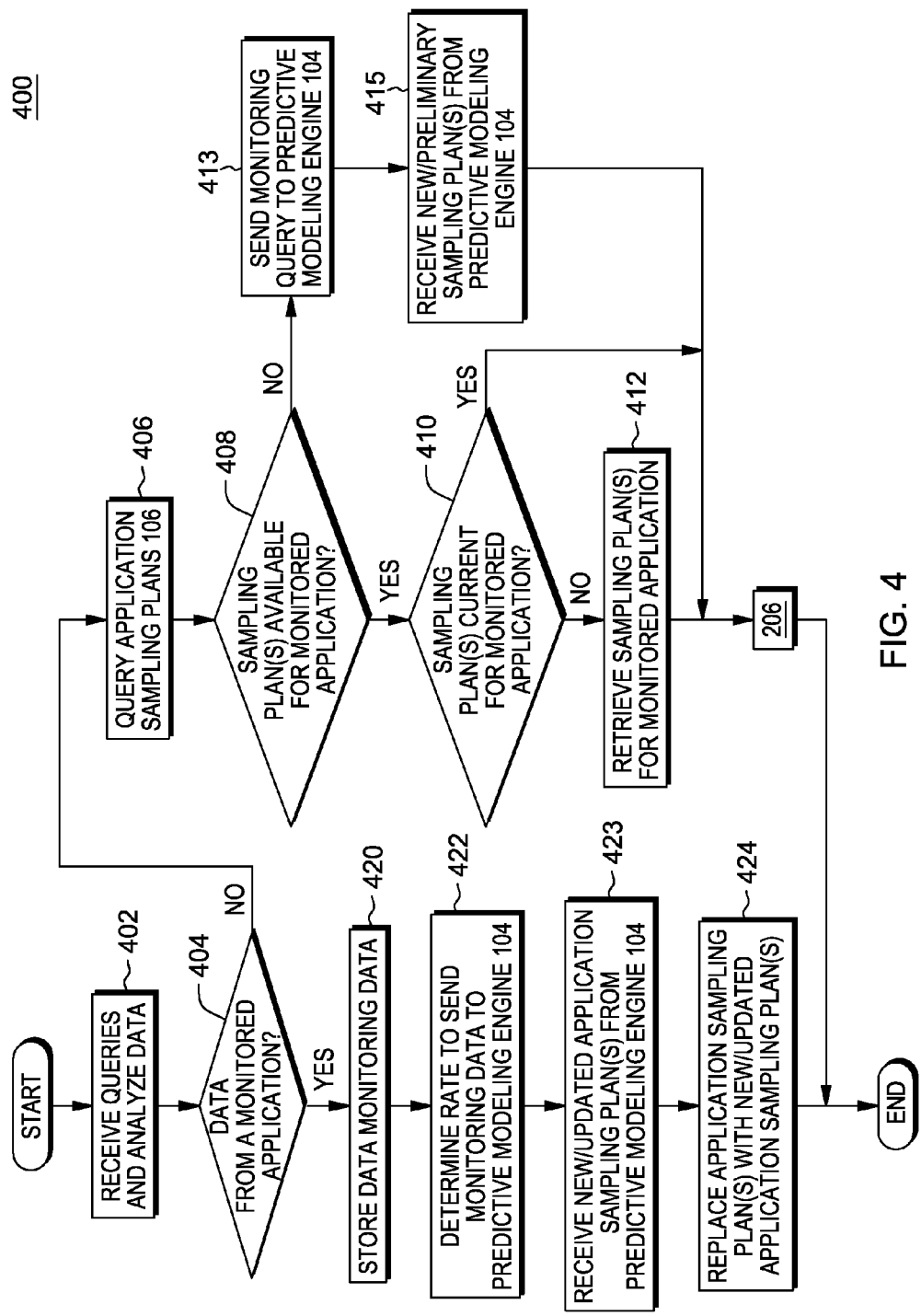
FIG. 4 depicts a flowchart of the steps of a sampling plan interface program, in accordance with an embodiment of the present invention.

FIG. 4 is a flowchart depicting operational steps sampling plan interface (SPI) program 400 (SPI) of application monitoring hub 108, executing on server 102 within distributed data processing environment 100 of FIG. 1. SPI program 400 receives queries from DDAM 200, on mobile device 120, to identify whether sampling plan(s) or updated sampling plan(s) are available in application sampling plans 106. For example, sampling plan(s) or updated sampling plan(s) for one or more monitored applications (e.g., application 122, application 124, and application 126) on mobile device 120. SPI program 400 transmits the identified sampling plan(s) to be stored (e.g., application sampling plans 128) on mobile device 120 via network 110. If one or more sampling plan(s) are not available for a monitored mobile software application (e.g., application 124), then SPI program 400 queries predictive modeling engine 104 to determine whether any sampling plans within application sampling plans 106 are associated with an application that has a similar profile or set of resource requirements to application 124. If so, predictive modeling engine 104 identifies the one or more sampling plans as preliminary sampling plans for application 124 until sufficient monitoring data is acquired to determine, by predictive modeling engine 104, another set of correlation coefficients with which to update the preliminary sampling plans for application 124.

In step 402, SPI program 400 receives queries or data from mobile device 120. In some instances, DDAM 200 carries out both querying and monitoring data transmission during a communication session. In an embodiment, SPI program 400 generates a query for information regarding the sampling plan(s) for a monitored mobile software application. In one scenario, DDAM 200, executing on mobile device 120, verifies whether the sampling plan for application 126 is the most recent version. In another scenario, during a communication DDAM 200, executing on mobile device 120, SPI program 400 determines that mobile device 120 does not possess one or more sampling plans for a monitored mobile software application (e.g., application 122). In response, SPI program 400 generates a query to identify the missing one or more sampling plans for the monitored mobile software application.

In another embodiment, SPI program 400 receives monitoring data from one or more sampling plans for one or more monitored mobile software applications executing on mobile device 120 and analyzes the monitoring data. In one scenario, SPI program 400 analyzes the monitoring data and determines that it is encrypted. In response to a determination of data encryption, SPI program 400 decrypts the monitoring data to determine the proper location to store the data (e.g., application database (not shown) on data storage 115, mobile device type database (not shown) on data storage 115, etc.). In another scenario, SPI program 400 identifies, by analysis of monitoring date, where the monitoring data is stored (e.g., on server 102, on data storage 115, or on application developer server 130). In another scenario, SPI program 400 identifies other information related to the monitoring data. In one instance, SPI program 400 identifies that the monitoring data for a monitored mobile software application is associated with a stable predictive model. In another instance, the monitoring data is associated with a mobile software application (e.g., application 122) that is still under development. In yet another instance, SPI program 400 identifies that the monitoring data contains indications of negative performance issues and that the sampling plan flags the negative performance issues (e.g., important, priority level=4, etc.).

In decision step 404, SPI program 400 determines whether the communication with MDSTS 300, executing on mobile device 120, is related to the transmission of monitoring data or is associated with sampling plan queries. In one embodiment, SPI program 400 determines that the communication with MDSTS 300 is associated with a transfer of monitoring data (yes branch, decision 404). Additionally, in some instances, SPI program 400 identified, in step 402, where the monitoring data is stored. Then in one scenario, SPI program 400 responds to the transfer of monitoring data by storing the monitoring data (in step 420) on server 102 to be subsequently analyzed by predictive modeling engine 104. Then in another scenario, SPI program 400 stores (in step 420) the transferred monitoring data in shared partition located on data storage 115 that is assessable by the ISV.

In step 422, SPI program 400 determines the rate at which monitoring data for each monitored mobile software application is sent to predictive modeling engine 104. In an embodiment, the transmission rate of the monitored data to predictive modeling engine 104 is constant. In one scenario, the monitoring transmission rate to predictive modeling engine 104 is set by the sampling plan. In one instance, SPI program 400 identifies the rate as part of the analysis of the monitoring data in step 402. In another instance, if SPI program 400, in step 402, did not identify a transmission rate, the monitoring transmission rate to predictive modeling engine 104 is a default set by predictive modeling engine 104. In another scenario, the transmission rate of monitored data changes. In one instance, the initial transmission rate is overridden by a trigger. For example, the monitoring data has flags associated with negative performance events. In yet another scenario, the models (not shown) for the mobile software application dictate the monitoring transmission rate to predictive modeling engine 104. For example, the model for application 124 identifies that application 124 is stable and that data is transmitted to predictive modeling engine 104 at a frequency of once per week. In another example, the ISV has released a new version of application 126 and resets the frequency of transmission of monitoring data to predictive modeling engine 104 to once per 48 hours.

In another embodiment, in step 422, SPI program 400 receives an indication (e.g., based on the analysis completed in step 402 from predictive modeling engine 104) that a sampling plan is available for a monitored mobile software application; however, the model for the monitored mobile software application (e.g., application 122) is not stable (e.g., incomplete). In one scenario, the monitoring data is sent to predictive modeling engine 104 at a high rate (e.g., once per hour) until predictive modeling engine 104 completes a model for application 122 and updates the sampling plans associated with application 122. In another scenario, SPI program 400 identifies that monitoring data for application 122 exhibits a threshold of negative performance events that is outside the parameters of the model for application 122. SPI program 400 indicates that the monitoring data for application 122 immediately sends to predictive modeling engine 104.

In step 423, SPI program 400 receives one or more created (i.e., new) or updated sampling plans from predictive modeling engine 104 for the monitored mobile software application. In an embodiment, the frequency in which predictive modeling engine 104 creates or updates sampling plans is highly variable. For example, a stable mobile software application receives updates to sampling plans every few months. In another example, a new mobile software application receives updates to the associated low-power sampling plan change every few days until predictive modeling engine 104 has enough data to analyze the interactions between mobile device states, calculating correlation coefficients for various parameters, and determining the appropriate device states to monitor.

In step 424, in one embodiment, SPI program 400 replaces one or more sampling plans in application sampling plans 106 with the respective created/updated one or more sampling plans for the monitored mobile software application received from predictive modeling engine 104, in step 423. In one scenario, SPI program 400 replaces the one or more sampling plans in application sampling plans 106 with the respective one or more created/updated sampling plans as the created/updated sampling plans are received. In another scenario, SPI program 400 replaces the one or more sampling plans in application sampling plans 106 with the respective one or more created/updated sampling plans based on a software maintenance schedule. For example, an ISV delays the placing the created/updated sampling plans, in application sampling plans 106, for applications 122, application 124, and application 126 until the midnight on the last day of a month. In another embodiment, SPI program 400 archives the one or more sampling plans prior to replacement.

Referring now to decision 404, if SPI program 400 determines that the transmission from DDAM 200 is not data for a monitored mobile software application (no branch, decision 404), then SPI program 400 queries application sampling plans 106 in step 406. In one embodiment, the query from DDAM 200 relates to determining if monitoring data storage 129, on mobile device 120, contains the full complement of sampling plans for a monitored mobile software application. In another embodiment, the query from DDAM 200 is to verify that the sampling plans associated with a monitored mobile software application are the same version as are contained in application sampling plans 106 on server 102.

In step 406, SPI program 400 determines the response to the query from mobile device 120. In one embodiment, SPI program 400 determines which sampling plans are associated with the mobile software application the query represents. In one scenario, SPI program 400 determines that the full complement of sampling plans associated with the query exists in application sampling plans 106. For example, after analyzing the information contained within the request from DDAM 200, SPI program 400 determines that mobile device 120 does not have a full complement of sampling plans stored for application 124 (e.g., missing the low-power sampling plan with interrupts). In response, SPI program 400 subsequently retrieves the missing sampling plan for application 124 in step 412. SPI program 400 transmits the missing sampling plan for application 124 via application monitoring hub 108 (refer to step 206) to mobile device 120 via network 110.

In another embodiment, SPI program 400 employs version control on the sampling plans associated with monitored mobile software applications. In one scenario, DDAM 200 identifies that mobile device 120 has the complement of sampling plans associated with application 122. However, SPI program 400 determines that the timestamp or revision for the one or more sampling plans within the complement of sampling plans for application 122 on mobile device 120 are back-level. In response, SPI program 400 identifies that an updated version of the one or more sampling plans for application 122 are available from application sampling plans 106, triggering the no branch of decision 410.

In decision step 408, if SPI program 400, working in conjunction with DDAM 200, determines that the complement of sampling plans identified in the query (in step 402) for a monitored mobile software application on mobile device 120 are in application sampling plans 128, then the yes branch of decision 408 is activated. Subsequently, in decision step 410, if SPI program 400, working in conjunction with DDAM 200, determines that the complement of sampling plans, in application sampling plans 128, for the monitored mobile software application on mobile device 120 are current (i.e. same version as in application sampling plans 106) (yes branch, decision 410), then SPI program 400 transmits a response to the query to DDAM 200 (step 206) via network 110 that no further actions are required.

In decision step 408, if SPI program 400 determines that one or more sampling plans in application sampling plans 106 are associated with the query from DDAM 200 (yes branch, decision 408), then SPI program 400 responds to the query from mobile device 120 based on the determinations made in step 406. In one embodiment, SPI program 400 determined that mobile device 120 does not have the full complement of sampling plans associated with a monitored mobile software application. In one scenario, mobile device 120 does not have one or more sampling plans associated with application 124 in application sampling plans 128; however, the requested sampling plan exist in application sampling plans 106. In some embodiments, the lack of a sampling plan on mobile device 120 equates to the lacking sampling plan as not current (i.e., back-level) with respect to the sampling plan in application sampling plans 106. In this scenario, the lack of a sampling plan on mobile device 120 triggers the no branch of decision 410. In another embodiment, SPI program 400 determines that the identified one or more sampling plans associated with a monitored mobile software application, on mobile device 120, are back-level versions with respect to the sampling plans in application sampling plans 106 on server 102 (no branch, decision 410).

In step 412, SPI program 400 retrieves the one or more sampling plans associated with the query from application sampling plans 106 on server 102 and transmits the one or more sampling plans to DDAM 200 executing on mobile device 120 via network 110. In on embodiment, SPI program 400 retrieves the sampling plans, from application sampling plans 106, associated with the monitored mobile software application that is missing one or more respective sampling plans to complete the complement of sampling plans for the monitored mobile software application. In another embodiment, if SPI program 400 identifies, in step 406, one or more sampling plans, in application sampling plans 106, which are newer versions (e.g., updated version) of one or more sampling plans on mobile device 120, then, in response, SPI program 400 retrieves the sampling plans associated with the monitored mobile software application identified as back-level on mobile device 120.

Referring now to decision 408, if SPI program 400 determines that one or more sampling plans associated with the identified mobile software application (e.g., application 126) do not exist in application sampling plans 106 (no branch, decision 408), then SPI program 400 sends the monitoring query to the predictive modeling engine 104 in step 413. In one example, the monitoring query sent to predictive modeling engine 104 includes the requirements of application 126, the details of application 126, and the developer of application 126. In one embodiment, predictive modeling engine 104 assigns one or more sampling plans to the new mobile software application to be monitored based on the sampling plans of a similar mobile software application. The new sampling plans are identified as "preliminary sampling" plans in subsequent data analysis by predictive modeling engine 104. In another embodiment, predictive modeling engine 104 creates one or more new sampling plans based on one or more of the stored mobile device states for other monitored mobile software applications, the performance data for other monitored software apps, the requirements of application developer for the application 126, or bench testing results (not shown) for application 126.

Referring now to step 415, SPI program 400 receives the new/preliminary sampling plans from predictive modeling engine 104 and transmits the results to DDAM 200 (step 206) executing on mobile device 120.

Figure 5:
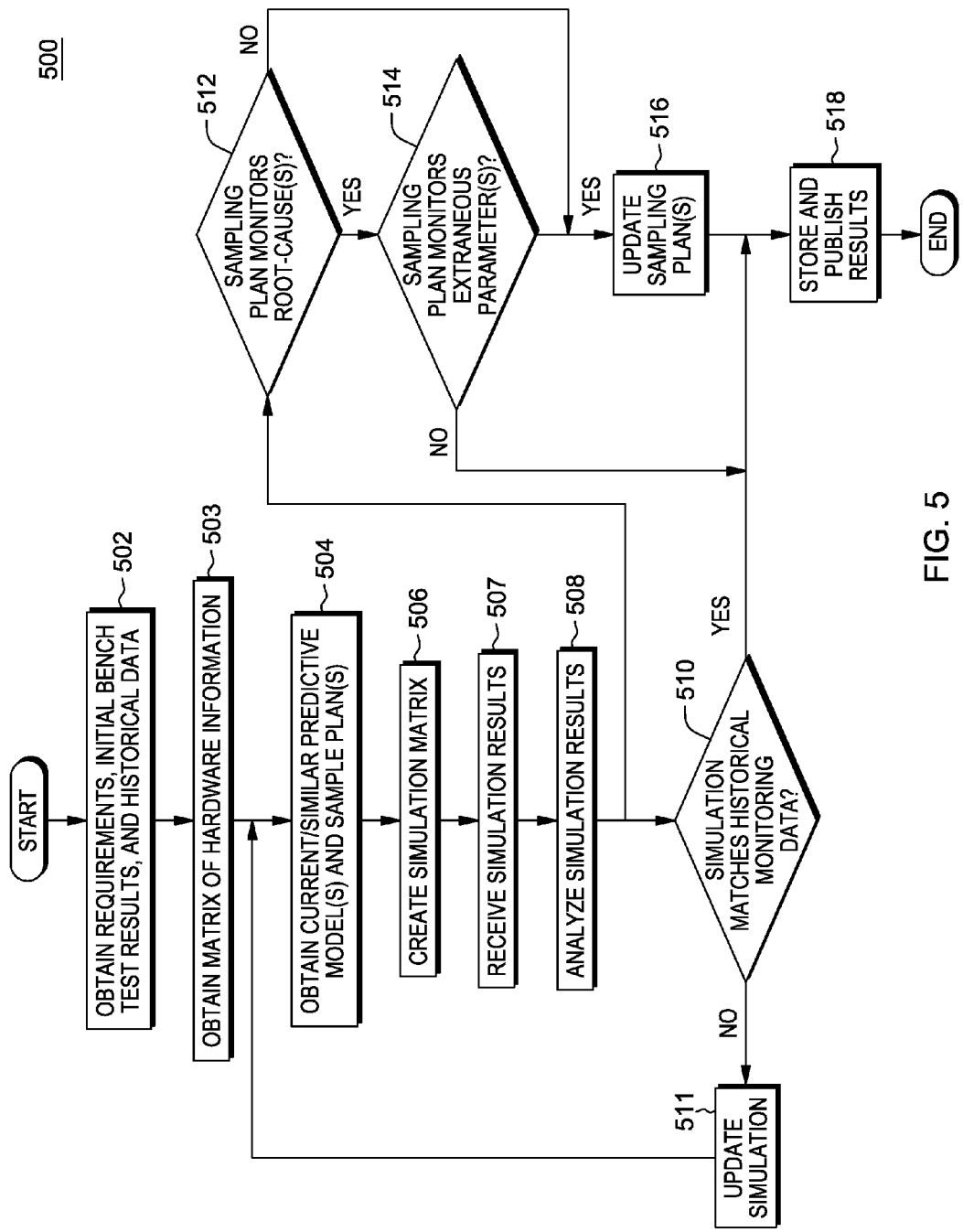
FIG. 5 depicts a flowchart of the steps of a simulation and root-cause analysis program, in accordance with an embodiment of the present invention.

FIG. 5 is a flowchart depicting operational steps for simulation and root-cause analysis program (SRCA) 500 of predictive modeling engine 104, executing on server 102 within distributed data processing environment 100 of FIG. 1.

In step 502, SRCA program 500 obtains at least one of the requirements, initial bench testing results, or the stored historical results for a mobile software application that is monitored. In an embodiment, the mobile software application that is monitored is a new mobile software application, and no historical data is available. In another embodiment, predictive modeling engine 104 performs an optimization review of a mobile software application that has a substantial amount of monitoring data stored (not shown), and SRCA program 500 verifies the models and sampling plan(s) for the mobile software application. In one scenario, the models and sampling plan(s) reside on server 102. In another scenario, the models and sampling plan(s), both current and archived, reside on data storage 115.

In step 503, SRCA program 500 obtains a matrix of hardware information compiled for each mobile device associated with the mobile software application to be evaluated. On one embodiment, the mobile device used (e.g., evaluated) for the evaluation of the mobile software application is a physical version of the mobile device. In another embodiment, the mobile device used (e.g., evaluated) for the evaluation of the mobile software application is a software construct (e.g., emulated). In one example, the hardware information includes a list of hardware on mobile device 120 (e.g., CPU, RAM, sensors, camera, communication interfaces, physical keyboard, etc.), built-in operating system (e.g., firmware), and possible hardware states (e.g., battery charging, camera mode (e.g., video vs. snapshot)).

In step 504, SRCA program 500 obtains modeling information. Some models include a combination of simulations, predictive models, or sampling plans. In an embodiment, SRCA program 500 obtains the predictive models and sampling plans associated with application 122 executing on a plurality of models of smartphones of a vendor. In one scenario, predictive modeling engine 104 creates models based on a plurality of information obtained in step 502 and in step 503. In another scenario, the developer of a mobile software application creates models by selecting and combining attributes of previously defined models. In another embodiment, SRCA program 500 does not have predictive models or sampling plans for mobile software applications executing on a new smartphone model. In one scenario, SRCA program 500 selects at least one of the simulations, the predictive models, or the sampling plans associated with the mobile software application for similar hardware configurations of smartphones of other smartphone vendors to use as a basis for simulations, for predictive models, or for sampling plans for the new smartphone model. In another scenario, predictive modeling engine 104, in conjunction with SRCA program 500, employs evolutionary algorithm-based methodologies (e.g., genetic programming) to create predictive models. For example, an ISV develops a new mobile software application that has no peer mobile software applications. In this instance, there are no similar models or sampling plans to use as the basis for a model for the new mobile software application. Predictive modeling engine 104 creates a sampling plan to capture a significant portion of the available mobile device states. In parallel, predictive modeling engine 104 and SRCA program 500 develop a plurality of models and simulations to compare to the monitoring data as the monitoring data is received. Predictive modeling engine 104 employs evolutionary algorithm-based methodologies to the results of the comparisons, in an iterative fashion, until the models stabilize. Predictive modeling engine 104 controls if and when models or simulations are deleted or archived.

In step 506, SRCA program 500 creates a simulation matrix for a mobile software application. Embodiments of the simulations created by SRCA program 500 vary from a relatively simple simulation, containing few parameters and emulating a single type of device, to simulations comprised of a plurality of emulated hardware and software configurations executing while subjected to a myriad of environmental conditions. In one embodiment, SRCA program 500 creates a simulation based on multiple types of emulations. In a first scenario, the hardware of one or more mobile devices is emulated via software. In one instance, additional, actual mobile software programs are "executing" (e.g., synthetic or dummy processes) on the emulated hardware including preprogrammed interaction with pseudo-users (e.g., synthetic transactions). In another instance, the additional mobile software programs are emulations "executing" (e.g., synthetic or dummy processes) on the emulated hardware as well as preprogrammed interaction with pseudo-users (e.g., synthetic transactions). In another scenario, each instance associated with the first scenario is implemented on actual mobile devices (e.g., physical hardware). Some simulations are be based on predefined scenarios. An example scenario is "fast moving, hands free" where some or all of the parameters are programmed to vary. For the "fast moving, hands free" scenario, one example set of parameters are GPS coordinates, accelerometer values, variations in a wireless communication standard, background noise distorting voice activated commands, network signal strength variations, etc. Parameters applied to the simulation range from stable, to vary within bounds (e.g., GPS coordinates), to varying based on a function (e.g., signal strength varying between cell tower "hand-offs"), or transient (e.g., sudden burst of interference), etc. In another scenario, SRCA program 500 applies various perturbations and permutations to the parameters and emulations within a simulation. For example, a Monte Carlo-type simulation of a mobile device software application executing on multiple emulated mobile device hardware platforms generates hundreds of thousands of discrete data points. Simulations of this magnitude lends itself to a computing cluster (not shown) or massively parallel processing (MPP) (not shown) solutions (e.g., cloud-computing).

In another embodiment, one or more models for a mobile software application, based on actual data, are used as the basis of the simulations. In one scenario, the simulations attempt to predict the behavior of the mobile software application at device states that have yet to occur during real-user monitoring. SRCA program 500 develops a statistical model of the likelihood of a negative performance occurrence and the severity of the occurrence. For example, the developer of the mobile software application performs a cost-benefit analysis based on the simulations to determine which additional performance bugs to address. Before going "live", the developer of the mobile software application uses SRCA program 500 to create simulations of the new version of the mobile software application to check that the fix for the one or more chosen performance bugs did not adversely affect the mobile software application in an unanticipated manner.

In step 507, SRCA program 500 receives the simulation results. In an embodiment, the results are obtained from one or more simulations created by SRCA program 500. In one scenario, the simulations execute on server 102. In another scenario, the simulations are off loaded and executed on a computing cluster accessible via network 110. The results of the simulations are transmitted by the computing cluster, back to server 102, via network 110. In another embodiment, the simulation results are obtained from simulations done by the ISV controlling application developer server 130.

In step 508, SRCA program 500 analyzes the simulation results. In an embodiment, the simulation results are used to validate the current models and sampling plans for a mobile software application. In one scenario, the results suggest an unknown interaction between device states. In another scenario, the analysis infers a different correlation coefficient between parameters than predictive modeling engine 104 initially calculated. Subsequent comparisons to historical monitoring indicates whether the original correlation coefficient or the new simulated correlation coefficient better fits the data. In another embodiment, the analysis of the simulation results identify the root-cause of a performance issue. In one scenario, subsequent comparisons to the historical monitoring data indicate that the sampling plan does not capture the device state needed to monitor the mobile software application properly.

In decision step 510, if SRCA program 500 analyzed the simulation results (in step 508), and the simulation results do not match the historical monitoring data within a first threshold (no branch, decision 510), then one or more simulations are updated.

In step 511, SRCA program 500 updates one or more simulations. In an embodiment, some parameters used in the simulations that did not match historical data are reset. SRCA program 500 constrains those parameters to vary within known real-world conditions, and the simulations are executed with the constrained parameters. In another embodiment, a subset of a large group of simulations fails to mimic the historical data within a second threshold. The subset of simulations is eliminated from future executions of the simulation matrix. In one scenario, the subset of simulations that failed are identified as to which conditions, software, or hardware contributed to the failure of the simulation. The subset of failed simulations are archived for the evaluation in conjunction with future monitoring data. For example, the archived simulations are subsequently compared against future outliers that are captured by the monitoring data to determine if specific simulations describe the outliers (e.g., root-cause). In another scenario, the subset of failed simulations is deleted because a change occurred that precludes specific conditions from occurring (e.g., a software patch to the operating system of the mobile device). In another embodiment, the archived simulations are executed using monitoring data from a different mobile software application that is similar to the mobile software application that the subset of simulations was created for originally. In one scenario, the subset of simulations, when executed using the monitoring data from the different mobile software application, yields results within the first threshold. The subset of simulations no longer "fail". In response, SRCA program 500 updates the subset of simulations in step 511. The updated subset of simulations executes using the monitoring data that resulted in the initial failure of the subset of simulations. In one example, the updated subset of simulations matches the historical data within the first threshold and is incorporated into the large group of simulations. In another example, the subset of simulations fails to match the historical monitoring data within the second threshold. The results are associated with the subset of simulations. The subset of simulations is returned to the archive.

Referring to decision step 510, if SRCA program 500 determines that the simulations match the historical data (yes branch, decision 510), then SRCA program 500 stores and publishes the results. In one embodiment, the ISV for the mobile software application had purchased a subscription to use predictive modeling engine 104, SRCA program 500, application sampling plans 106, and application monitoring hub 108. The results of the simulation and the associated monitoring data is sent to application developer server 130 via network 110. In another embodiment, the simulation results are sent to the hardware vendor that designed mobile device 120. For example, the hardware vendor for the mobile device uses the simulation results to identify an issue within the operating system that controls mobile device 120. In another embodiment, an external entity accesses the simulation results to improve the stability of a mobile software application.

Independent of decision 510, in one embodiment, SRCA program 500 determines which sampling plan(s) monitor the parameters or device states that captures monitoring data related to one or more identified root-causes. Subsequently, SRCA program 500 identifies sampling plan parameters that are extraneous. For example, SRCA program 500 reduces the monitoring "overhead" that DDAM 200 incurs monitoring unneeded mobile device states.

In decision step 512, if SRCA program 500 determines that a sampling plan does not capture the data relating to a root-cause identified by simulations (no branch, decision 512), then SRCA program 500 subsequently updates the affected sampling plan. In an embodiment, SRCA program 500 refers to the simulation results (in step 508) and whether the simulation results match the historical monitoring data (in decision 510) to update the sampling plan that did not capture data related to a root-cause. In one scenario, SRCA program 500 replaces one mobile device state with a different mobile device state related to the root-cause. In another embodiment, the developer of the mobile software application is contacted (e.g., e-mailed) with the results. The developer of the mobile software application modifies the parameters for the simulation and executes SRCA program 500 based on the parameter change.

In step 516, in one embodiment, SRCA program 500 updates the sampling plan(s) within application sampling plans 106 that do not capture the monitoring data associated with the root-cause of a performance issue associated with a monitored mobile software application (e.g., application 124). In one scenario, some or all simulation activity was suspended and root-cause information is based on bench-test results on actual hardware. In another scenario, insufficient historical data was available to obtain statistically significant simulation results for a mobile software application, which in turn improperly associated device states and root-causes in a sampling plan update. Subsequent analysis by SRCA program 500, on a larger set of monitoring data, creates a new complement of sampling plans for the mobile software application. The new sampling plans provide an improved correlation between the root-causes of performance issues and the monitored mobile device states. In another embodiment, SRCA program 500 uses the simulations results to update the sampling plan(s) for the mobile device application (e.g., application 122). In another embodiment, SRCA program 500 uses other functions within predictive modeling engine 104 to update the affected sampling plan(s) for the mobile device application (e.g., application 124). In one scenario, SRCA program 500 sorts through stored and published results to determine if any other monitored mobile device software applications experienced similar performance issue(s) related to the same root-cause(s) that affect application 124. If SRCA program 500 identifies other mobile device application(s) (e.g., application 126) that demonstrate similar performance issues(s), then SRCA program 500 creates a simulation based on the monitoring data from application 124 and generates a hybrid sampling plan(s). For example, if the comparison is successful or within the first threshold, then SRCA program 500 replaces the application 124 sampling plan(s), in application sampling plans 106, with the hybrid sampling plan(s).

In step 518, SRCA program 500 stores and publishes the updates to sampling plan(s) and the relationships of the sampling plan(s) to the simulation results and the historical monitoring data. In one embodiment, SRCA program 500 stores the results on server 102. In one scenario, SRCA program 500 sends the developers of a monitored mobile software application an e-mail that the results of at least one of the latest simulations, sampling plans, or root-cause analysis are available for review in a subdirectory on server 102. In another scenario, SRCA program 500 transmits the results, via network 110, directly to the mobile application software developers and to the mobile hardware vendor that is working in collaboration.

Referring to decision 512, if SRCA program 500 determines that the sampling plan(s) capture the monitoring data associated with one or more root-cause(s) (yes branch, decision 512), then SRCA program 500 determines if the simulation results (step 508) identify any extraneous parameters.

Referring to decision 514, if SRCA program 500 determines that one or more parameters within a sampling plan are extraneous (yes branch, decision 514), then SRCA program 500 updates the sampling plan (step 516). In one embodiment, SRCA program 500 identifies the extraneous parameter that is monitored based, at least in part on models (in step 504) and simulations (output of yes branch, decision 510). In another embodiment, the extraneous parameter is identified by analyzing historical monitoring data.

Referring to decision 514, if SRCA program 500 determines that there are no extraneous parameters being monitored within sampling plan(s) (no branch decision 514), then SRCA program 500 stores and publishes the simulation results related to sampling plans, root-cause monitoring, and historical data (step 518).

Figure 6:
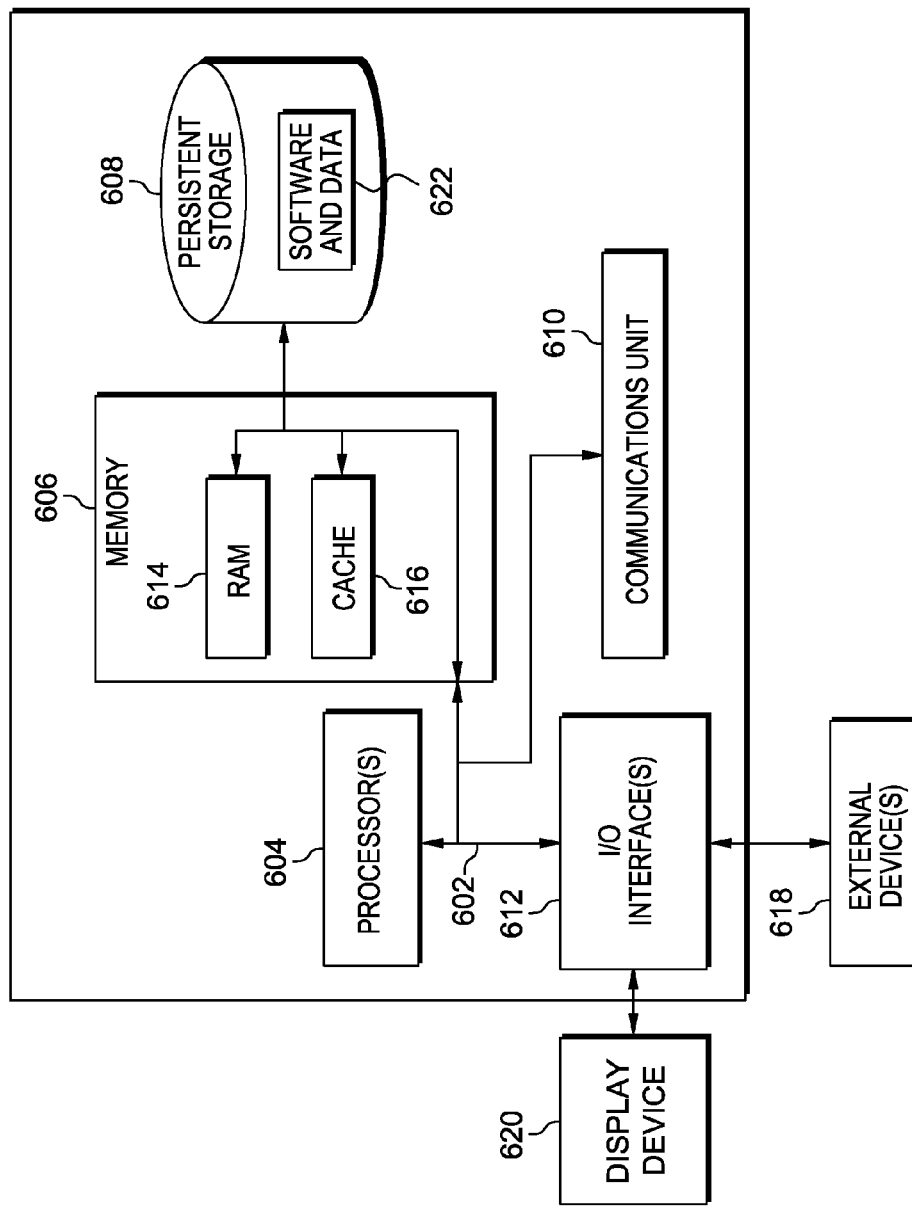
FIG. 6 is a block diagram of components of a computer, in accordance with an embodiment of the present invention.

FIG. 6 depicts a block diagram of components of computer 600, which is representative of mobile device 120, server 102, and application developer server 130, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media. Software and data 622 are stored in persistent storage 608 for access and/or execution by processors 604 via one or more memories of memory 606. With respect to mobile device 120, software and data 622 includes dynamic data acquisition module (DDAM) 200, application 122, application 124, application 126, application sampling plans 128, monitoring data storage 129, and monitoring data storage and transmission subroutine (MDSTS) 300. With respect to server 102, software and data 622 includes predictive modeling engine 104, application sampling plans 106, application monitoring hub 108, sampling plan interface (SPI) program 400, and simulation and root-cause analysis (SRCA) program 500.

In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information. In an alternate embodiment, data storage 115 is persistence storage which can be a stand-alone unit, part of a storage area network (SAN), part of a network attached storage (NAS) system, or virtualized storage on a computing cluster.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of mobile device 120, server 102, application developer server 130, and data storage 115. In these examples, communications unit 610 includes one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computer 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data 622 used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor. Display 620 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring software application performance and one or more device states affecting a software application on a periodic basis on a mobile device, the method comprising:
    identifying, by one or more computer processors, a software application on a mobile device;
    identifying, by one or more computer processors, a plurality of sampling plans and one or more respective triggers within the plurality of sampling plans that are respectively associated with the software application and are stored on the mobile device;
    determining, by one or more computer processors, a first value associated with the one or more respective triggers;
    selecting, by one or more computer processors, a first sampling plan from the plurality of sampling plans for the software application based, at least in part, on the first value associated with the one or more respective triggers;
    determining, by one or more computer processors, a sampling rate for a first data, based at least in part, on the first sampling plan;
    obtaining, by one or more computer processors, the first data associated with the software application, wherein the first data is monitored by the mobile device and is obtained based on a sampling rate associated with the first data, and wherein first data includes at least one of: an indication of performance of the software application, and a state of the mobile device that is based, at least in part, on the first sampling plan; and transmitting the first data to a computer system, wherein transmission occurs when at least a portion of the first data, as dictated by the first sampling plan, is obtained.

2. The method of claim 1, wherein the one or more respective triggers include at least one of: a state of the mobile device, an event, and an override condition, wherein the device state includes a battery power level associated with the mobile device.

3. The method of claim 1, further comprising:
identifying, by one or more computer processors, a first frequency rate for transmission of the first data, wherein the first frequency rate is associated with the first sampling plan;
determining, by one or more computer processors, whether the first frequency rate is slower than the sampling rate;
responsive to a determination that the first frequency rate is slower than the sampling rate, accumulating, by one or more computer processors, the first data on the mobile device;
determining, by one or more computer processors, whether all monitoring data associated with the first sampling plan has been obtained; and
transmitting an accumulation of the first data at the first frequency rate to the computer system.

4. The method of claim 1, further comprising:
responsive to a determination that a condition occurred that inhibits the transmission of the first data, accumulating, by one or more computer processors, the first data on the mobile device; and
responsive to a determination that the condition changed to a state that allows, at least in part, the mobile device to resume transmission, transmitting the first data to the computer system, wherein the transmission of an accumulation of the first data is initiated at least based in part by a rule on the mobile device.

5. The method of claim 1, further comprising:
determining, by one or more computer processors, that the first value associated with the one or more respective triggers has been replaced with a second value;
selecting, by one or more computer processors, a second sampling plan, from the plurality of sampling plans associated with the software application, based on, at least in part, a relationship between the second value and a second one or more respective triggers within the plurality of sampling plans.

6. The method of claim 1, further comprising:
responsive to a determination that a third sampling plan, included in the plurality of sampling plans, is associated with the software application and is not present on the mobile device, determining, by one or more computer processors, whether a computer system includes the third sampling plan; and
responsive to a determination that the computer system includes the third sampling plan, obtaining, by one or more computer processors, the third sampling plan, from the computer system, such that the third sampling plan is stored on the mobile device.

7. The method of claim 1, further comprising:
determining, by one or more computer processors, whether a fourth sampling plan, which is included in the plurality of sampling plans, has been updated; wherein a determination of whether the fourth sampling plan has been updated comprises:
communicating, by one or more computer processors, with a computer system, wherein the computer system hosts one or more sampling plans for the software application;
determining, by one or more computer processors, whether a version of the fourth sampling plan on the mobile device is an updated version of a corresponding fourth sample plan that is included as part of the computer system; and
responsive to a determination that the version of the fourth sampling plan on the mobile device is not the updated version of the corresponding fourth sample plan, replacing, by one or more computer processors, the version of the fourth sampling plan on the mobile device with the updated version of the corresponding fourth sample plan from the computer system.

8. The method of claim 1, wherein identifying a software application is based, at least in part, on at least one of: monitoring software embedded within the software application, an indication associated with the software application, a list of one or more software applications on the mobile device that are monitored, an indication within the plurality of sampling plans that identifies the one or more software applications that are monitored, and indication signal from an external entity that indicates the one or more software applications that are monitored.

* * * * *